United States Patent
Zhovnirovsky et al.

(10) Patent No.: US 8,109,678 B1
(45) Date of Patent: Feb. 7, 2012

(54) PUNCH-DOWN FIBER OPTIC CABLE TERMINATION

(75) Inventors: Igor Zhovnirovsky, Newton, MA (US); Subhash Roy, Lexington, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 12/756,087

(22) Filed: Apr. 7, 2010

Related U.S. Application Data

(63) Continuation-in-part of application No. 12/652,705, filed on Jan. 5, 2010, which is a continuation-in-part of application No. 12/581,799, filed on Oct. 19, 2009, which is a continuation-in-part of application No. 12/483,616, filed on Jun. 12, 2009.

(51) Int. Cl.
- *G02B 6/36* (2006.01)
- *G02B 6/38* (2006.01)
- *G02B 6/32* (2006.01)
- *G02B 6/26* (2006.01)
- *G02B 6/44* (2006.01)

(52) U.S. Cl. ........ 385/81; 385/62; 385/65; 385/66; 385/70; 385/76; 385/78; 385/88; 385/92; 385/94; 385/100

(58) Field of Classification Search ............ 385/62, 385/65, 66, 76, 77, 78, 81, 83, 87, 92, 100, 385/101, 102

See application file for complete search history.

(56) References Cited

U.S. PATENT DOCUMENTS

| | | | | |
|---|---|---|---|---|
| 5,239,604 A | * | 8/1993 | Ziebol et al. | 385/84 |
| 2001/0048793 A1 | * | 12/2001 | Dair et al. | 385/92 |
| 2008/0107381 A1 | * | 5/2008 | Nishioka et al. | 385/60 |
| 2008/0159696 A1 | * | 7/2008 | Suzuki et al. | 385/72 |

* cited by examiner

*Primary Examiner* — Brian M. Healy
*Assistant Examiner* — Hung Lam
(74) *Attorney, Agent, or Firm* — Law Office of Gerald Maliszewski; Gerald Maliszewski

(57) ABSTRACT

An optic connector jack is provided with a punch-down fiber optic cable termination. The jack is made up of a housing with a connector mating interface, for connection to a plug connector, and a cradle for receiving a fiber optic cable. The cradle has at least one U-shaped punch-down blade for securing each fiber optic cable with respect to the housing. A crimping plate overlies the cradle and mates to the housing for securing each fiber optic cable in the cradle. The U-shaped punch-down blade has an open top portion, a closed bottom portion, and an inside diameter about equal to a fiber optic cable diameter. The U-shaped punch-down blade has an interior blade edge, the interior blade edge securing a fiber optic cable by slicing into at least a part of the fiber optic cable circumference. In one aspect, the jack includes a lens for each fiber optic cable.

22 Claims, 5 Drawing Sheets

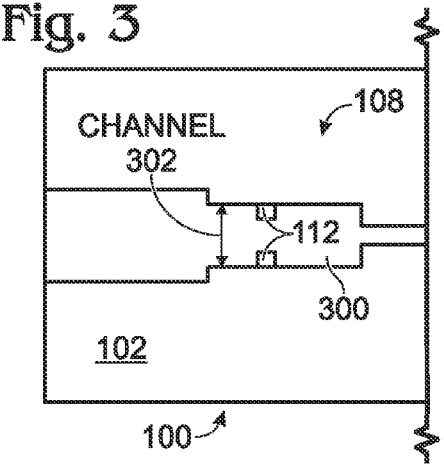
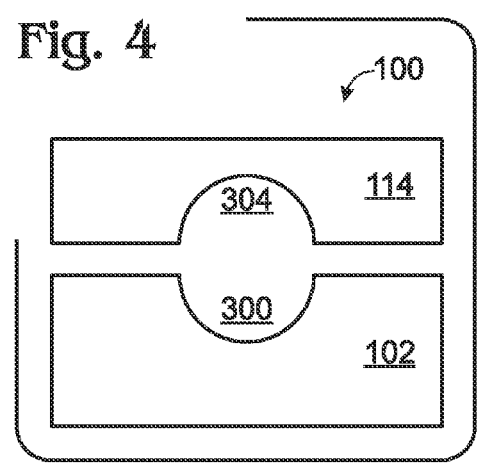
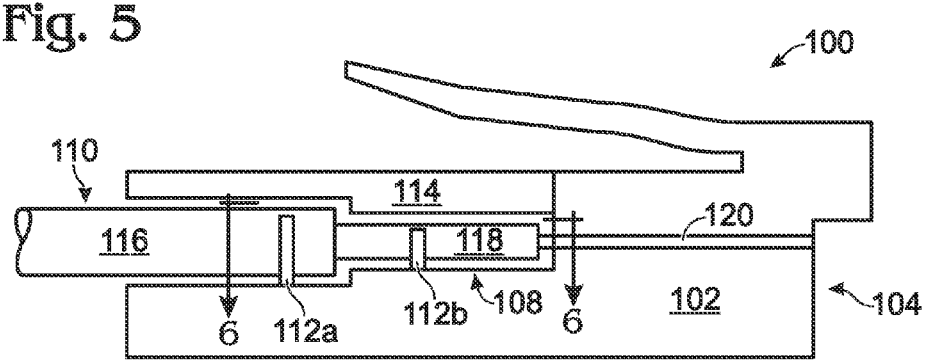
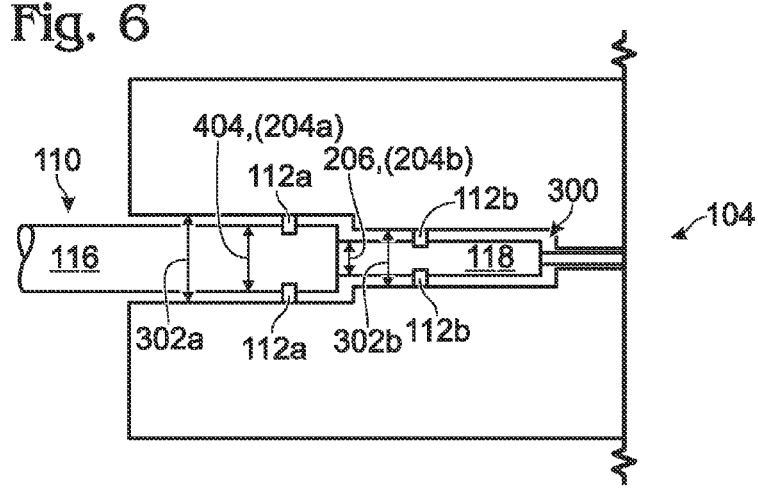

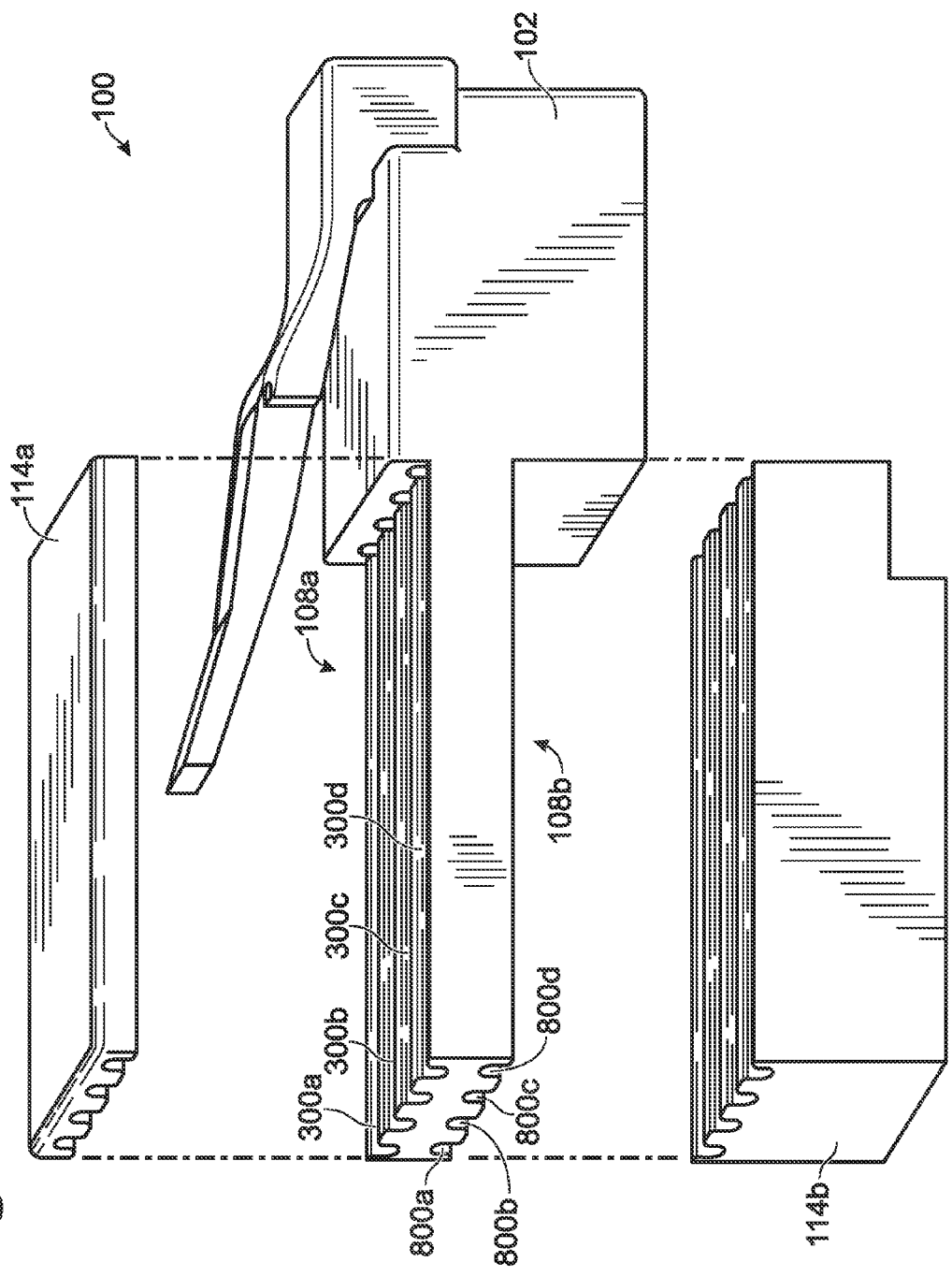

PUNCH-DOWN FIBER OPTIC CABLE TERMINATION

RELATED APPLICATIONS

This application is a Continuation-in-Part of a pending application entitled, CONNECTOR JACK PROCESSING BACKCAP, invented by Igor Zhovnirovsky et al., Ser. No. 12/652,705, filed Jan. 5, 2010, which is a Continuation-in-Part of:

a pending application entitled, OFF-AXIS MISALIGNMENT COMPENSATING FIBER OPTIC CABLE INTERFACE, invented by Igor Zhovnirovsky et al., Ser. No. 12/581,799, filed Oct. 19, 2009, which is a Continuation-in-Part of:

a pending application entitled, FIBER OPTIC CABLE INTERFACE, invented by Igor Zhovnirovsky et al., Ser. No. 12/483,616, filed Jun. 12, 2009. All these application are incorporated herein by reference.

BACKGROUND OF THE INVENTION

1. Field of the Invention

This invention generally relates to signal cable connectors and, more particularly, to a punch-down means of rapidly and securing terminating optical signal cables in a connector jack or plug.

2. Description of the Related Art

As noted in Wikipedia, plastic optical fiber (POF) is an optical fiber which is made out of plastic. Conventionally, poly(methyl methacrylate) (PMMA), a transparent thermoplastic (acrylic) alternative to glass, is the core material, and fluorinated polymers are the cladding material. Since the late 1990s however, much higher-performance POF based on perfluorinated polymers (mainly polyperfluorobutenylvinylether) has begun to appear in the marketplace.

In large-diameter fibers, 96% of the cross section is the core that allows the transmission of light. Similar to conventional glass fiber, POF transmits light (or data) through the core of the fiber. The core size of POF is in some cases 100 times larger than glass fiber.

POF has been called the "consumer" optical fiber because the fiber and associated optical links, connectors, and installation are all inexpensive. The conventional PMMA fibers are commonly used for low-speed, short-distance (up to 100 meters) applications in digital home appliances, home networks, industrial networks (PROFIBUS, PROFINET), and car networks (MOST). The perfluorinated polymer fibers are commonly used for much higher-speed applications such as data center wiring and building LAN wiring.

For telecommunications, the more difficult-to-use glass optical fiber is more common. This fiber has a core made of germania-doped silica. Although the actual cost of glass fibers is lower than plastic fiber, their installed cost is much higher due to the special handling and installation techniques required. One of the most exciting developments in polymer fibers has been the development of microstructured polymer optical fibers (mPOF), a type of photonic crystal fiber.

In summary, POF uses PMMA or polystyrene as a fiber core, with refractive indices of 1.49 & 1.59, respectively. The fiber cladding overlying the core is made of silicone resin (refractive index ~1.46). A high refractive index difference is maintained between core and cladding. POF have a high numerical aperture, high mechanical flexibility, and low cost.

Generally, POF is terminated in cable assembly connectors using a method that trims the cables, epoxies the cable into place, and cures the epoxy. ST style connectors, for example, include a strain relief boot, crimp sleeve, and connector (with ferrule). The main body of the connector is epoxied to the fiber, and fiber is threaded through the crimp sleeve to provide mechanical support. The strain relief boot prevents to fiber from being bent in too small of a radius. Some connectors rely upon the connector shape for mechanical support, so a crimp sleeve is not necessary.

First, the strain relief boot and crimp sleeve are slid onto the cable. A jacket stripping tool must be used to remove the end portion of the fiber, exposing an aramid yarn (e.g., Kevlar™) covered buffer or cladding layer. Next, a buffer stripping tool is used to remove a section of the buffer layer, exposing the core. After mixing, a syringe is filled with epoxy. A bead of epoxy is formed at the end of the ferrule, and the ferrule back-filled with epoxy. The exposed fiber core is threaded through the connector ferrule with a rotating motion, to spread the epoxy, until the jacket meets the connector. At this point the crimping sleeve is slide onto the connector body and crimped in two places. Then, the strain relief boot can be slide over the crimp sleeve. After the epoxy cures, the core extending through the ferrule is polished with a lapping film. Then, the core is scribed at the point where it extends from the epoxy bead. The extending core potion is then cleaved from the connector and polished in multiple steps.

It would be advantageous if an optical fiber could be quickly attached to a connector.

It would be advantageous if an efficient crimping method could be used to attach an optical fiber to a connector, avoiding processes that heat the fiber, as heating processes are known to curl the fiber.

SUMMARY OF THE INVENTION

Accordingly, an optic connector jack is provided with a punch-down fiber optic cable termination. The jack is made up of a housing with a connector mating interface, for connection to a plug connector, and a cradle for receiving a fiber optic cable. The cradle has at least one U-shaped punch-down blade for securing each fiber optic cable with respect to the housing. A crimping plate overlies the cradle and mates to the housing for securing each fiber optic cable in the cradle. The U-shaped punch-down blade has an open top portion, a closed bottom portion, and an inside diameter about equal to a fiber optic cable diameter. The U-shaped punch-down blade has an interior blade edge, the interior blade edge securing a fiber optic cable by slicing into at least a part of the fiber optic cable circumference. The crimping plate has an interior surface overlying the U-shaped punch-down blade open top portion, forcing the fiber optic cable against the closed bottom portion. In one aspect, the jack includes a lens for each fiber optic cable. Each lens has a first surface adjacent the cradle for transceiving an optical signal with a fiber optic cable end, and a second end adjacent the housing connector mating interface, for transceiving an optical signal with a plug connector.

Additional details of the above-described optic cable jack, a plug, and an optic cable assembly with punch-down fiber optic cable connector jack terminations are provided below.

BRIEF DESCRIPTION OF THE DRAWINGS

FIG. 3 is a partial cross-sectional plan view of the cradle of FIG. 1.

FIG. 4 is a partial cross-sectional view of the jack of FIG. 1, depicting a partial channel formed in the crimping plate.

FIGS. 5 and 6 are partial cross-sectional views of a first variation of the jack of FIG. 1.

FIG. 8 is a perspective drawing depicting a third variation of the jack shown in FIG. 1.

DETAILED DESCRIPTION

Figure 1:
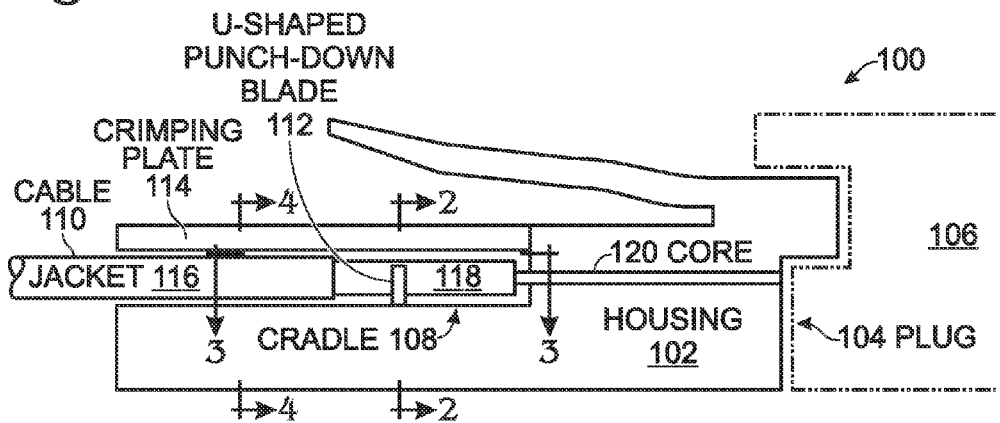
FIG. 1 is a partial cross-sectional view of an optic connector jack with a punch-down fiber optic cable termination.

FIG. 1 is a partial cross-sectional view of an optic connector jack with a punch-down fiber optic cable termination. The jack 100 comprises a housing 102 with a connector mating interface 104, for connection to a plug connector 106 (in phantom). As used herein, a jack is the "female" connector and a plug is a mating "male" connector. The jack further comprises a cradle 108 for receiving a fiber optic cable 110. The cradle 108 has at least one U-shaped punch-down blade 112 for securing each fiber optic cable 110 with respect to the housing 102. A crimping plate 114 overlies the cradle 108 and mates to the housing 102 for securing each fiber optic cable 110 in the cradle. The fiber optic cable includes a jacket layer 116 overlying a cladding layer 118, which overlies a core 120.

Figure 2A:
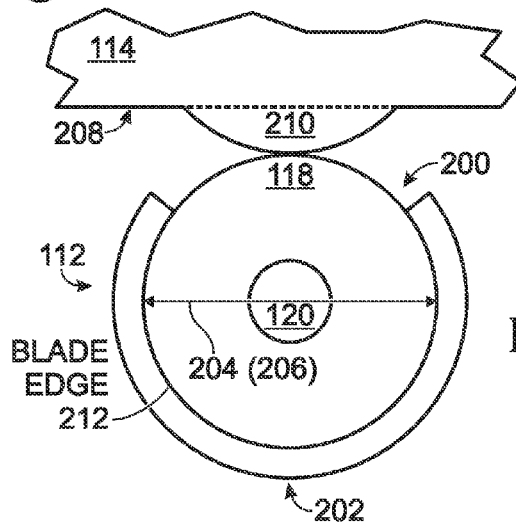
FIGS. 2A and 2B are partial cross-sectional alternative views of the jack of FIG. 1, as seen from an orthogonal perspective.
Figure 2B:
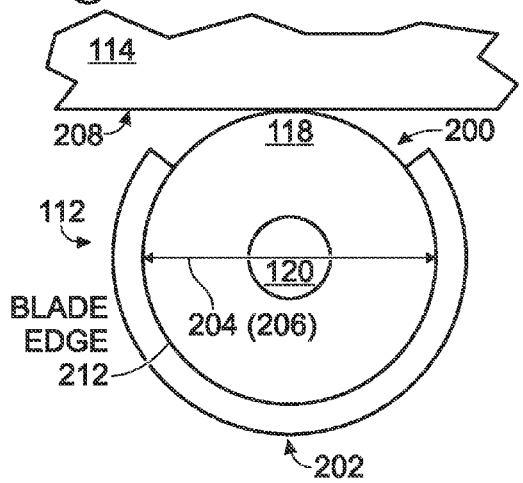

FIGS. 2A and 2B are partial cross-sectional alternative views of the jack of FIG. 1, as seen from an orthogonal perspective. The U-shaped punch-down blade 112 has an open top portion 200, a closed bottom portion 202, and an inside diameter 204 about equal to a fiber optic cable diameter. More explicitly, the inside diameter is about equal to the cladding diameter 206 The crimping plate 114 has an interior surface 208 with a locking knoll 210 (FIG. 2A) overlying the U-shaped punch-down blade open top portion 200, forcing the fiber optic cable 110 against the closed bottom portion 202. Alternately (FIG. 2B) the interior surface can be flat. In one aspect as shown, the U-shaped punch-down blade 112 has an interior blade edge 212. The interior blade edge 212 secures the fiber optic cable 110 by slicing into at least a part of the fiber optic cable circumference. In this aspect, the inside diameter 204 is slightly smaller than the cable diameter 206.

FIG. 3 is a partial cross-sectional plan view of the cradle 108 of FIG. 1. Typically, the cradle 108 includes a channel 300 for each fiber optic cable 110. The channel has a channel diameter 302. The U-shaped punch-down blade 112 is formed in the channel, with an interior diameter (see FIGS. 2A and 2B) aligned with, and about equal to the channel diameter 302.

FIG. 4 is a partial cross-sectional view of the jack of FIG. 1, depicting a partial channel formed in the crimping plate. As in FIG. 3, a channel 300 is formed in the housing 102. However, the channel 300 (partial body portion) of FIG. 4 is partially formed in the housing, with a top portion 304 partially formed in the crimping plate 114.

FIGS. 5 and 6 are partial cross-sectional views of a first variation of the jack of FIG. 1. In this aspect, the cradle 108 includes a plurality of U-shaped punch-down blades in each channel 300. Shown are U-shaped punch-down blades 112a and 112b. Blade 112a may be used, for example, to secure the jacket part 116 of the cable 110, while punch-down blade 112b may be used to secure the cladding part 118.

More explicitly, each channel 300 includes a proximal portion adjacent the jack connector mating interface 104, with a fiber cladding diameter 302b, which is a diameter about the same as the cladding diameter 206. Each channel also includes a distal portion having a fiber jacket diameter 302a, which is a diameter about the same as the jacket diameter 404. A U-shaped cladding punch-down blade 112b is formed in the channel proximal portion, having an inside diameter 204b about equal to the fiber cladding diameter 206. A U-shaped jacket punch-down blade 112a is formed in the channel distal portion, having an inside diameter 204a about equal to the fiber jacket diameter 404. When the U-shaped punch-down blade is formed without a blade edge, the cable is held in place by the pressure formed between the cable, the channel inside surface touching the cable, and the crimping plate. In this aspect, the open top portion may be a slightly smaller diameter than the cable diameter.

As shown in FIGS. 2A and 2B, each U-shaped punch-down blade 112a/112b may have an interior blade edge 212. The U-shaped cladding punch-down blade 112b would have an inside diameter 204b less than the fiber cladding diameter 206 (see FIG. 12A). Likewise, the U-shaped jacket punch-down blade 112a would have an inside diameter 204a less than the fiber jacket diameter 404.

Figure 7:
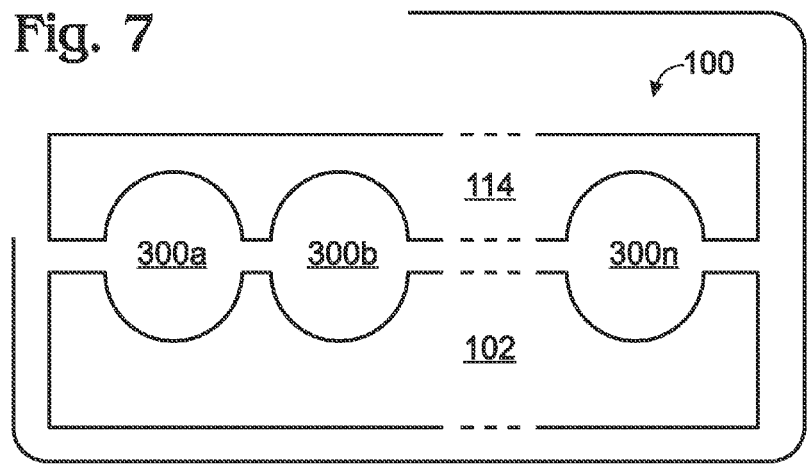
FIG. 7 is a partial cross-sectional view depicting a second variation of the jack shown in FIG. 1.

FIG. 7 is a partial cross-sectional view depicting a second variation of the jack shown in FIG. 1. For simplicity, the jack described in FIGS. 1-6 terminates a single optical cable. However, the jack can be modified to accept a plurality of cables. Shown is a jack with n channels, to accept n optical cables, where n is a variable not limited to any particular value.

FIG. 8 is a perspective drawing depicting a third variation of the jack shown in FIG. 1. In this aspect there is a top row of channels 300a through 300d, and a bottom row of channels 800a through 800d. The form factor of the jack is similar to the ubiquitous RJ45 or P8C8 connector. However, it should be noted that the connector can be adapted to accept a different number of cables (other than 4) in each row. It should also be noted that the number of channels in the top row need not equal the number of channels in the bottom row.

Finally, it should be noted that the channels 300 are partially formed in the connector housing 102, and partially formed in the crimping plates 114a and 114b. However, the dual-row variation of the jack need not be made with partial channels in the crimping plates. More generically, the housing 102 includes a top cradle 108a formed in a top surface of the housing, for securing at least one fiber optic cable, and a bottom cradle 108b formed in a bottom surface of the housing, for securing at least one fiber optic cable. A top crimping plate 114a (with or without channels or locking knolls) overlies the top cradle 108a, and a bottom crimpling plate 114b (with or without channels or locking knolls) overlies the bottom cradle 108b.

Figure 9A:
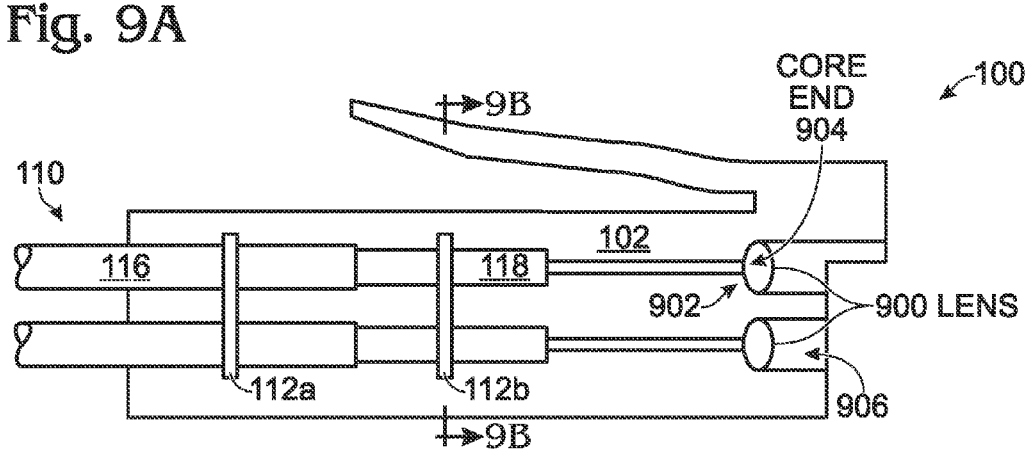
FIGS. 9A and 9B are partial cross-sectional views of the jack depicted in FIG. 8.
Figure 9B:
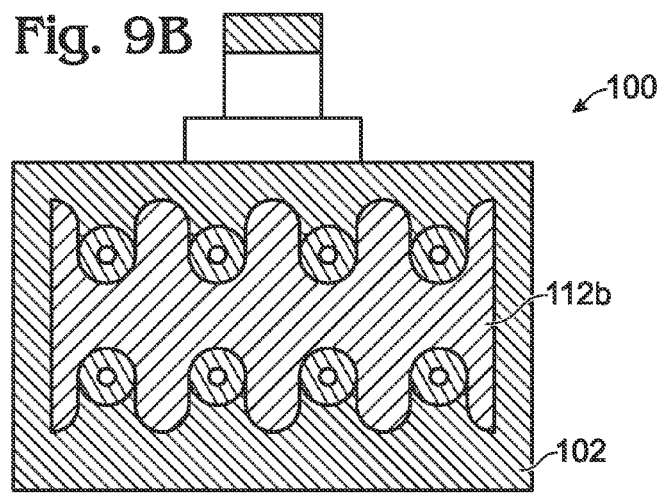

FIGS. 9A and 9B are partial cross-sectional views of the jack depicted in FIG. 8. FIG. 9A also depicts a fourth variation of the jack shown in FIG. 1. In contrast to FIG. 9A, FIG. 1 depicts an optical cable core extending through the body, and terminating at the connector mating interface, as is conventional. Alternately as shown, the jack may include a lens 900 for each fiber optic cable. Each lens 900 has a first surface 902 adjacent the cradle 108 for transceiving an optical signal with a fiber optic cable end 904, and a second end 906 adjacent the housing connector mating interface 104, for transceiving an optical signal with a plug connector.

Figure 10:
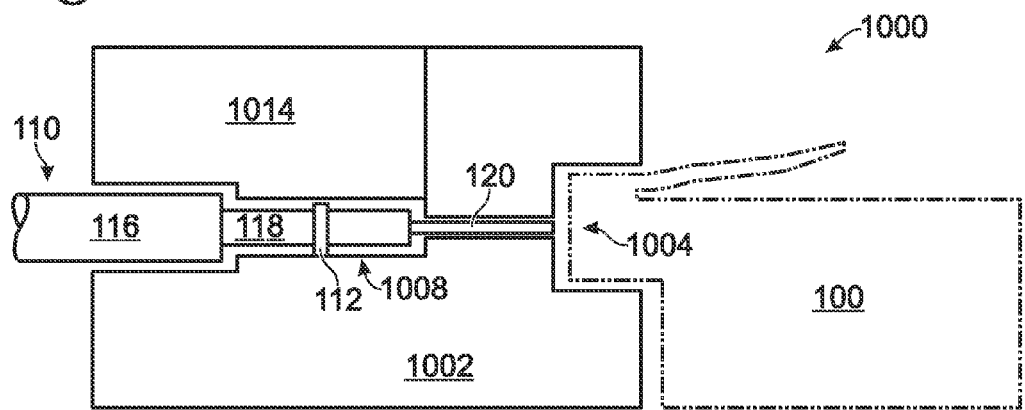
FIG. 10 is a partial cross-sectional view of an optic connector plug with a punch-down fiber optic cable termination.

FIG. 10 is a partial cross-sectional view of an optic connector plug with a punch-down fiber optic cable termination. The plug 1000 comprises a housing 1002 with a connector mating interface 1004, for connection to jack connector 100 (in phantom). The plug 1000 has a cradle 1008 for receiving a fiber optic cable 110. The cradle 1008 has at least one U-shaped punch-down blade 112 for securing each fiber optic cable 110 with respect to the housing 1002. A crimping plate 1014 overlies the cradle 1008 and is mated to the housing 1002 for securing each fiber optic cable 110 in the cradle 1008. Details of the plug are essentially the same as the jack, described above in the explanation of FIGS. 1-9B, and are not repeated here in the interest of brevity.

Figure 11:
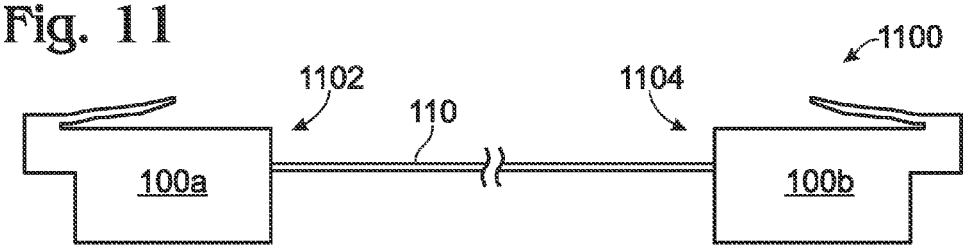
FIG. 11 is a diagram depicting an optic cable assembly with punch-down fiber optic cable connector jack terminations.

FIG. 11 is a diagram depicting an optic cable assembly with punch-down fiber optic cable connector jack terminations. The cable assembly 1100 comprises at least one fiber optic cable 110 having a proximal end 1102 and a distal end 1104. A first connector jack 100a is attached to the fiber optic cable proximal end 1102, and a second connector jack 100b attached to the fiber optic cable distal end 1104. The connector jacks 100a and 100b are as described above, and their explanation is not repeated in the interest of brevity. Alternately but not shown, the cable assembly may be comprised of one jack connector and one plug connector, or two plug connectors.

Figure 12A:
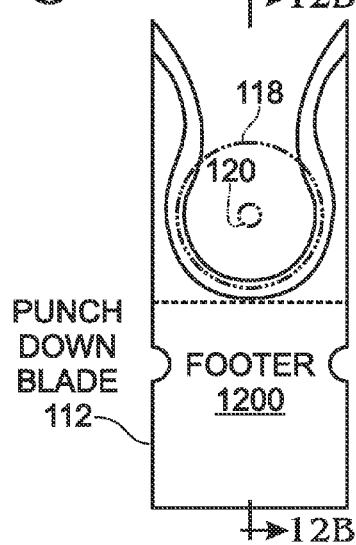
FIGS. 12A and 12B are depictions of the U-shaped punch-down blades of FIGS. 2A and 2B, with the addition of a footer, for securing the blade to the housing.
Figure 12B:
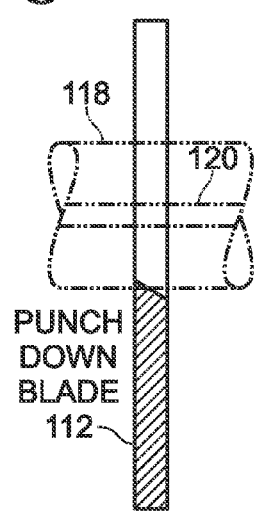

FIGS. 12A and 12B are depictions of the U-shaped punch-down blades of FIGS. 2A and 2B, with the addition of a footer 1200, for securing the blade to the housing.

Connector jack, plug, and cable assemblies have been provided featuring punch-down fiber optic cable terminations. Examples of particular blade shapes, blade positioning, and channel layouts have been given to illustrate the invention. However, the invention is not limited to merely these examples. Other variations and embodiments of the invention will occur to those skilled in the art.

We claim:

1. An optic connector jack with a punch-down fiber optic cable termination, the jack comprising:
   a housing with a connector mating interface, for connection to a plug connector, and a cradle for receiving a fiber optic cable, the cradle having at least one U-shaped punch-down blade for securing each fiber optic cable with respect to the housing by slicing into at least a part of a fiber optic cable circumference and exposing an underlying cladding layer; and,
   a crimping plate overlying the cradle and mated to the housing for securing each fiber optic cable in the cradle.

2. The optic connector jack of claim 1 wherein the U-shaped punch-down blade has an open top portion, a closed bottom portion, and an inside diameter about equal to a fiber optic cable diameter; and,
   wherein the crimping plate has an interior surface overlying the U-shaped punch-down blade open top portion, forcing the fiber optic cable against the closed bottom portion.

3. The optic connector jack of claim 1 wherein the U-shaped punch-down blade has an interior blade edge, the interior blade edge securing a fiber optic cable by slicing into at least a part of the fiber optic cable circumference.

4. The optic connector jack of claim 1 wherein the cradle includes a channel for each fiber optic cable, having a channel diameter; and,
   wherein the U-shaped punch-down blade is formed in the channel, with an interior diameter aligned with, and about equal to the channel diameter.

5. The optic connector jack of claim 4 wherein the cradle has includes a plurality of U-shaped punch-down blades in each channel.

6. The optic connector jack of claim 5 wherein each channel includes a proximal portion adjacent the connector mating interface, with a fiber cladding diameter, and a distal portion having a fiber jacket diameter, and further includes:
   a U-shaped cladding punch-down blade formed in the channel proximal portion, having an inside diameter about equal to the fiber cladding diameter; and,
   a U-shaped jacket punch-down blade formed in the channel distal portion, having an inside diameter about equal to the fiber jacket diameter.

7. The optic connector cable of claim 6 wherein each U-shaped punch-down blade has an interior blade edge;
   wherein the U-shaped cladding punch-down blade has an inside diameter less than the fiber cladding diameter; and,
   wherein the U-shaped jacket punch-down blade has an inside diameter less than the fiber jacket diameter.

8. The optic connector cable of claim 1 wherein the housing includes a top cradle formed in a top surface of the housing, for securing at least one fiber optic cable, and a bottom cradle formed in a bottom surface of the housing, for securing at least one fiber optic cable; and,
   wherein the crimping plate includes a top crimping plate overlying the top cradle, and a bottom crimpling plate overlying the bottom cradle.

9. The optic connector cable of claim 1 further comprising:
   a lens for each fiber optic cable, each lens having a first surface adjacent the cradle for transceiving an optical signal with a fiber optic cable end, and a second end adjacent the housing connector mating interface, for transceiving an optical signal with a plug connector.

10. An optic cable assembly with punch-down fiber optic cable connector jack terminations, the cable assembly comprising:
    at least one fiber optic cable having a circumference, a proximal end, and a distal end;
    a first connector jack attached to the fiber optic cable proximal end, and a second connector jack attached to the fiber optic cable distal end, each connector jack including:
       a housing with a connector mating interface, for connection to a plug connector, and a cradle for receiving the fiber optic cable end, the cradle having at least one U-shaped punch-down blade for securing each fiber optic cable with respect to the housing by slicing into at least a part of the fiber optic cable circumference and exposing an underlying cladding layer; and,
       a crimping plate overlying the cradle and mated to the housing for securing each fiber optic cable in the cradle.

11. The cable assembly of claim 10 wherein the U-shaped punch-down blade has an open top portion, a closed bottom portion, and an inside diameter about equal to a fiber optic cable diameter; and,
    wherein the crimping plate has an interior surface overlying the U-shaped punch-down blade open top portion, forcing the fiber optic cable against the closed bottom portion.

12. The cable assembly of claim 10 wherein the U-shaped punch-down blade has an interior blade edge, the interior blade edge securing a fiber optic cable by slicing into at least a part of the fiber optic cable circumference.

13. The cable assembly of claim 10 wherein the cradle includes a channel for each fiber optic cable, having a channel diameter; and,
  wherein the U-shaped punch-down blade is formed in the channel, with an interior diameter aligned with, and about equal to the channel diameter.

14. The cable assembly of claim 13 wherein the cradle has includes a plurality of U-shaped punch-down blades in each channel.

15. The cable assembly of claim 14 wherein each channel includes a proximal portion adjacent the connector mating interface, with a fiber cladding diameter, and a distal portion having a fiber jacket diameter, and further includes:
  a U-shaped cladding punch-down blade formed in the channel proximal portion, having an inside diameter about equal to the fiber cladding diameter; and,
  a U-shaped jacket punch-down blade formed in the channel distal portion, having an inside diameter about equal to the fiber jacket diameter.

16. The cable assembly of claim 15 wherein each U-shaped punch-down blade has an interior blade edge;
  wherein the U-shaped cladding punch-down blade has an inside diameter less than the fiber cladding diameter; and,
  wherein the U-shaped jacket punch-down blade has an inside diameter less than the fiber jacket diameter.

17. The cable assembly of claim 10 wherein the housing includes a top cradle formed in a top surface of the housing, for securing at least one fiber optic cable, and a bottom cradle formed in a bottom surface of the housing, for securing at least one fiber optic cable; and,
  wherein the crimping plate includes a top crimping plate overlying the top cradle, and a bottom crimpling plate overlying the bottom cradle.

18. The cable assembly of claim 10 further comprising:
  a lens for each fiber optic cable, each lens having a first surface adjacent the cradle for transceiving an optical signal with a fiber optic cable end, and a second end adjacent the housing connector mating interface, for transceiving an optical signal with a plug connector.

19. An optic connector plug with a punch-down fiber optic cable termination, the plug comprising:
  a housing with a connector mating interface, for connection to jack connector, and a cradle for receiving a fiber optic cable, the cradle having at least one U-shaped punch-down blade for securing each fiber optic cable with respect to the housing by slicing into at least a part of a fiber optic cable circumference and exposing an underlying cladding layer; and,
  a crimping plate overlying the cradle and mated to the housing for securing each fiber optic cable in the cradle.

20. The optical connector plug of claim 19 wherein the housing cradle receives a plastic optical fiber (POF) fiber optic cable with a light transmission core selected from a group consisting of polystyrene and poly(methyl methacrylate) (PMMA), and the U-shaped punch-down blade has an inside diameter less than a fiber cladding diameter surrounding the core.

21. The optical connector jack of claim 1 wherein the housing cradle receives a plastic optical fiber (POF) fiber optic cable with a light transmission core selected from a group consisting of polystyrene and poly(methyl methacrylate) (PMMA), and the U-shaped punch-down blade has an inside diameter less than a fiber cladding diameter surrounding the core.

22. The cable assembly of claim 10 wherein the fiber optic cable is a plastic optical fiber (POF) fiber optic cable with a light transmission core selected from a group consisting of polystyrene and poly(methyl methacrylate) (PMMA); and,
  wherein the U-shaped punch-down blades of the first and second connector have inside diameters less than a fiber cladding diameter surrounding the core.

* * * * *